United States Patent
Mueller et al.

(10) Patent No.: US 7,134,342 B1
(45) Date of Patent: Nov. 14, 2006

(54) MAGNETIC INFRASOUND SENSOR

(75) Inventors: Fred M. Mueller, Los Alamos, NM (US); Lawrence Bronisz, Los Alamos, NM (US); Holger Grube, Los Alamos, NM (US); David C. Nelson, Santa Fe, NM (US); Jonathan L. Mace, Los Alamos, NM (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 86 days.

(21) Appl. No.: 10/932,654

(22) Filed: Aug. 31, 2004

(51) Int. Cl.
*G01P 15/105* (2006.01)
*G01P 15/08* (2006.01)

(52) U.S. Cl. .................. 73/652; 73/514.16; 73/514.31

(58) Field of Classification Search .................. 73/652, 73/514.16, 514.31
See application file for complete search history.

(56) References Cited

U.S. PATENT DOCUMENTS

| | | | | |
|---|---|---|---|---|
| 4,124,813 A | * | 11/1978 | Mefed et al. | 324/310 |
| 4,164,149 A | * | 8/1979 | Okubo | 73/594 |
| 4,839,872 A | * | 6/1989 | Gragnolati et al. | 367/180 |
| 5,136,547 A | * | 8/1992 | Laukien | 367/1 |
| 5,258,709 A | * | 11/1993 | Laukien | 324/300 |
| 5,309,411 A | * | 5/1994 | Huang et al. | 367/140 |
| 5,625,348 A | * | 4/1997 | Farnsworth et al. | 340/690 |

* cited by examiner

*Primary Examiner*—Helen Kwok
(74) *Attorney, Agent, or Firm*—Jim C. Durkis; Thomas S. O'Dwyer; Paul A. Gottlieb

(57) ABSTRACT

A magnetic infrasound sensor is produced by constraining a permanent magnet inside a magnetic potential well above the surface of superconducting material. The magnetic infrasound sensor measures the position or movement of the permanent magnet within the magnetic potential well, and interprets the measurements. Infrasound sources can be located and characterized by combining the measurements from one or more infrasound sensors. The magnetic infrasound sensor can be tuned to match infrasound source types, resulting in better signal-to-noise ratio. The present invention can operate in frequency modulation mode to improve sensitivity and signal-to-noise ratio. In an alternate construction, the superconductor can be levitated over a magnet or magnets. The system can also be driven, so that time resolved perturbations are sensed, resulting in a frequency modulation version with improved sensitivity and signal-to-noise ratio.

25 Claims, 5 Drawing Sheets

MAGNETIC INFRASOUND SENSOR

STATEMENT OF GOVERNMENT INTEREST

The United States Government has rights in this invention pursuant to Contract No. W-7405-ENG-36 between the United States Department of Energy and the University of California for the operation of the Los Alamos National Laboratory.

FIELD OF THE INVENTION

The present invention relates to the field of infrasound sensors. Infrasound sensors are typically used in earthquake detection, oil exploration, and other applications involving measuring infrasound waves propagating through the earth. More particularly, the present invention is a magnetic infrasound sensor (MIS) that is an extremely sensitive device capable of measuring the movement of a permanent magnet within a magnetic potential well. The permanent magnet inside the MIS moves in relation to infrasound waves hitting the MIS.

BACKGROUND OF THE INVENTION

Infrasound sensors are used in a diverse set of applications ranging from discovering oil pools, finding underground structures, locating seismic events, and even predicting earthquakes or volcanic eruptions. The wide range of sensors employed in these activities includes accelerometers, strain gauges, inertial oscillators, and laser interferometers. Generally, the focus of these systems has been to cover a broad band of infrasound frequencies and to avoid sensitivity to transversely polarized infrasound waves. However, when the characteristics of a signal are known, such as the speed of sound in certain geologic strata, broadband sensors do not perform as well as sensors tuned to the signal.

The shortcomings of the broadband sensors are most apparent in the signal-to-noise ratio of the sensor output signal. All of the energy in the entire sensitivity range of the sensor is measured and the desired signals must be filtered out of those data. Additionally, infrasound signals have such low frequencies that they are hard to transmit after conversion to electronic signals. Accurate transmission of low frequency signals typically involves a modulation scheme by which a higher frequency, which is less susceptible to noise, is used to carry the low frequency information. The present invention is ideal for measuring infrasound signals because it can be tuned for reception of a specific range of signals and because it allows for frequency modulation as the infrasound signal interacts with the magnetic infrasound sensor itself.

Infrasound waves are extremely low frequency sound waves generally below the 20 Hz human hearing threshold and travel at the speed of sound through a medium. In the earth, their speed is typically close to 1460 meters per second. Based on their speed and frequency, infrasound waves typically have a wavelength in excess of 243 meters. Infrasound waves are capable of traveling around the earth, enabling the measurement of distant events if a sufficiently sensitive sensor is used.

BRIEF SUMMARY OF THE INVENTION

It is a feature of the present invention to provide a magnetic infrasound sensor (MIS) that is an extremely sensitive device capable of measuring the movement of a permanent magnet within a magnetic potential well or a superconductor moving with respect to a magnetic field.

When, in accordance with an aspect of the present invention, the physical act of pushing the permanent magnet close to a superconductor surface, the creation of electrical currents within the superconductor results. Furthermore, the trapped electrical currents in the superconductor act to keep the permanent magnet fixed in place. If the permanent magnet is moved from it's position, the currents in the superconductor exert a restoring force to return the permanent magnet to its original position. However, there is little damping force in the system, unlike when the permanent magnet is forcibly placed, and the permanent magnet will instead oscillate around its original position. The superconductor can be of any construction, including a bulk material or a thin film.

Restorative forces exerted by currents within the superconductor create a magnetic potential well trapping the permanent magnet in three orthogonal directions. The movement of the permanent magnet within the potential well is indicative of external forces, such as infrasound waves, acting on the sensor. Measuring the position or movement of the permanent magnet relative to the potential well yields a signal indicative of the external forces, and analyzing the measured signal yields a measurement of those external forces. Alternatively, the system can be constructed so that the movement of a levitated superconductor can be measured.

In accordance with methods of carrying out the present invention, an infrasound wave is usually generated at a single spot, called the source location, such as an earthquake epicenter or the location of an explosion. A single infrasound sensor measures the strength and velocity of an infrasound wave. However, the measurement from a single infrasound sensor indicates the strength and velocity of the infrasound wave at the place the sensor location, not the source location.

Multiple sensors can be placed in different locations to measure the strength and velocity of the infrasound wave at each sensor location. The multiple measurements can be combined and analyzed to find the source location and the strength of the event causing the infrasound wave.

Figure 1:
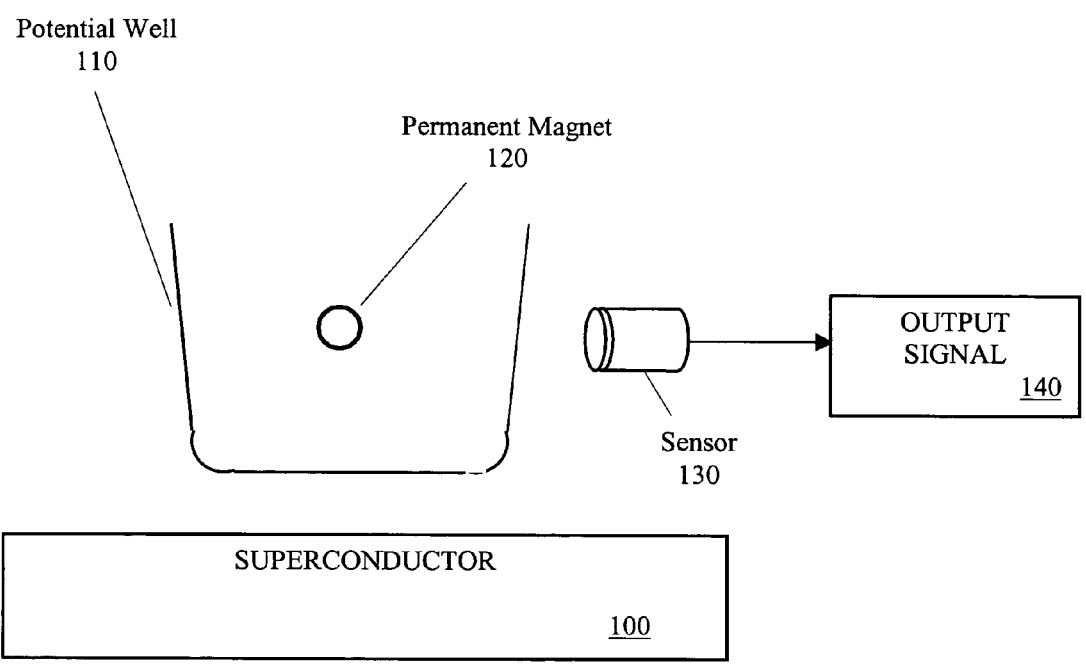
FIG. 1 is a diagram of a magnetic infrasound sensor.
Figure 1A:
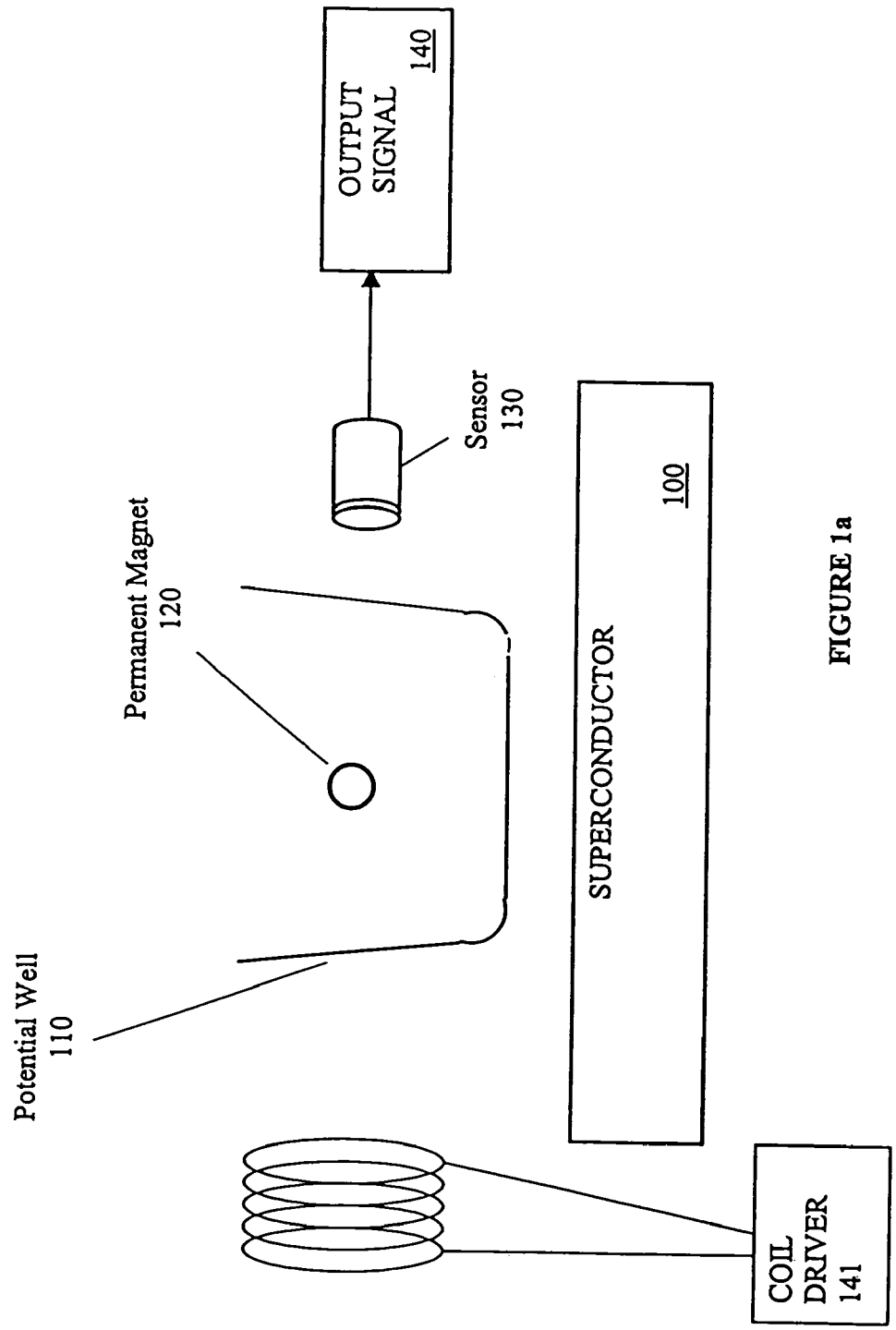
FIG. 1a is a diagram of a magnetic infrasound sensor with driving means to operate as a frequency modulation mode (FMM) sensor.

Frequency modulation (FM) mode: In addition, a greater sensitivity can be achieved by adding a driving means as a fourth element of the system turning an amplitude modulation system as shown in FIG. 1, into a frequency modulation system as shown in FIG. 1a. The driving element (for example an electromagnetic coil driven by an amplifier) can excite and drive the levitated magnet with particular frequencies to excite certain vibrational modes of movement. The phase and amplitude shift of these modes when external vibrations (seismic waves or the like) perturb the system can be used to more precisely determine the effects of the perturbation. Signal-to-noise ratio and sensitivity improvements are realized with a frequency modulated system analogous to the improvements in fidelity of FM over AM radio.

DETAILED DESCRIPTION OF THE INVENTION

A magnetic infrasound sensor can be produced by constraining a permanent magnet inside a magnetic potential well in proximity to the surface of superconducting material. The sensor can be used by measuring the position or movement of the permanent magnet within the magnetic potential well and interpreting the measurements. Infrasound sources can be located and characterized by combining the measurements from one or more infrasound sensors.

Earthquakes, volcanic eruptions, explosions, and even subterranean digging are all sources of infrasound waves. Infrasound waves exhibit two different kinds of polarization: P-waves or primaries are longitudinal waves; S-waves or secondaries are transverse waves. Combinations of the primaries and secondaries are often observed. An infrasound sensing system can also see the air shock from an explosion if the system is close enough to the blast. However, infrasound sensors are often thousands of miles from the source of the measured waves. When an infrasound sensor is shaken by an infrasound wave, the sensor generates a signal based on the direction the wave is moving, the strength or amplitude of the wave, the frequency of the wave, and the polarization of the wave.

A basic magnetic infrasound sensor comprises three different parts as shown in FIG. 1: A piece of superconductor with a surface 100; a permanent magnet 120; and a sensing device 130. An analytical engine 140 may be connected to the sensing device 130. The physical act of pushing a permanent magnet close to the surface of the superconductor creates trapped electric currents within the superconductor. The trapped electric currents in the superconductor act to keep the permanent magnet where it was placed. If the permanent magnet is moved from its position, the currents in the superconductor exert a force to return the permanent magnet to its original position. The restorative forces exerted by the currents within the superconductor instantiate a magnetic potential well 110 trapping the permanent magnet. It is important to note that the physical act of forcing the permanent magnet onto the superconductor and placing it at a proper height above the superconductor creates the potential well. Without careful placement, a weak magnetic potential well or no magnetic potential well at all can be created, in which case the permanent magnet is free to move away from the superconductor.

FIG. 1a demonstrates a frequency modulation (FM) system. A greater sensitivity is achieved by adding a driving means 141 as a fourth element of the system turning the amplitude modulation (AM) system, shown in FIG. 1, into an FM system. The driving means 141 (e.g., an electromagnetic coil driven by an amplifier) can excite and drive the levitated magnetic with particular frequencies to excite certain vibrational modes of movement. The phase and amplitude shift of these modes when external vibrations (seismic waves or the like) perturb the system can be used to more precisely determine the effects of the external perturbation.

When an infrasound wave displaces the permanent magnet within the potential well, a restorative force is exerted to return the permanent magnet to its previous position. However, there is almost zero damping force in the system and the permanent magnet will move past its original position resulting in the permanent magnet oscillating around its original position. The movement of the permanent magnet within the potential well is indicative of external forces, such as infrasound waves.

The permanent magnet can move in a translational or rotational manner within the potential well. Translation is characterized by the general notions of up-down, left-right, or in-out corresponding to the three axis in a three dimensional Cartesian coordinate system. The possible rotations of the permanent magnet are characterized by the three Eulerian angles of a rigid body.

Regardless of the specific movements or position of the permanent magnet, one or more sensing devices must be used to detect them. Any of a number of sensing device types is suitable for measuring a specific movement or position. Some useful sensing devices, such as electromagnetic pick-up coils, capacitive proximity sensors and optical means are appropriate for measuring translational velocities. Some sensing devices generate more than a single number as a measurement at any given time. For example, a position sensor can report three numbers corresponding to position along the x, y, and z axis. Additionally, multiple sensing devices can be used. The result of the plethora of possible sensing devices and measurements is that a time varying signal is generated corresponding to the translational and rotational movements of the permanent magnet. Furthermore, the signal itself can be one dimensional, such as a measure of x position, or multidimensional, such as a measure of x, y, and z position.

An inversion of all of the above arrangements is also possible: A superconductor can be levitated over at least one magnet and the movement of the superconductor can be sensed in order to determine response to vibrational input. A plurality of magnets can be used to create a magnetic field of desired geometry in order to shape and control the magnetic well properties of the device. This shaping of the potential well could be useful for tuning desirable resonant modes and frequencies.

The signal from the sensing device or devices is raw data that must be analyzed to yield information regarding an infrasound wave. The signal can be stored or can be analyzed immediately. A computer is ideal for analyzing the signal. The computer can analyze the signal directly, as in FIG. 2 wherein the signal 200 is interpreted by analysis software 210 to produce a measurement of the infrasound wave 220.

Figure 2:
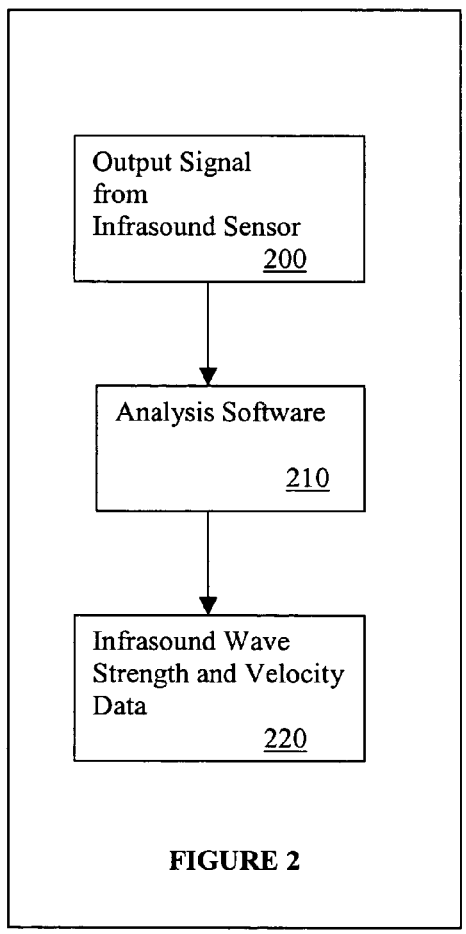
FIG. 2 depicts the analysis of an infrasound signal without the benefit of precomputed data.
Figure 3:
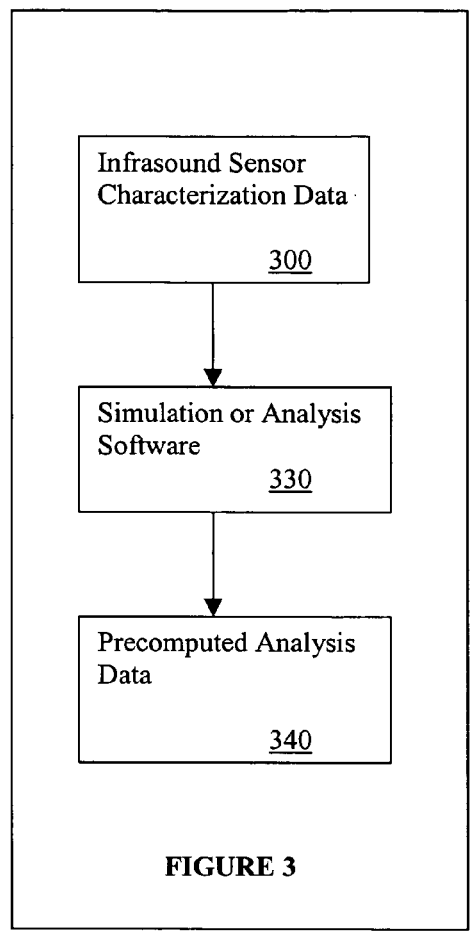
FIG. 3 depicts the precomputation of data useful in the analysis of an infrasound sensor signal.
Figure 4:
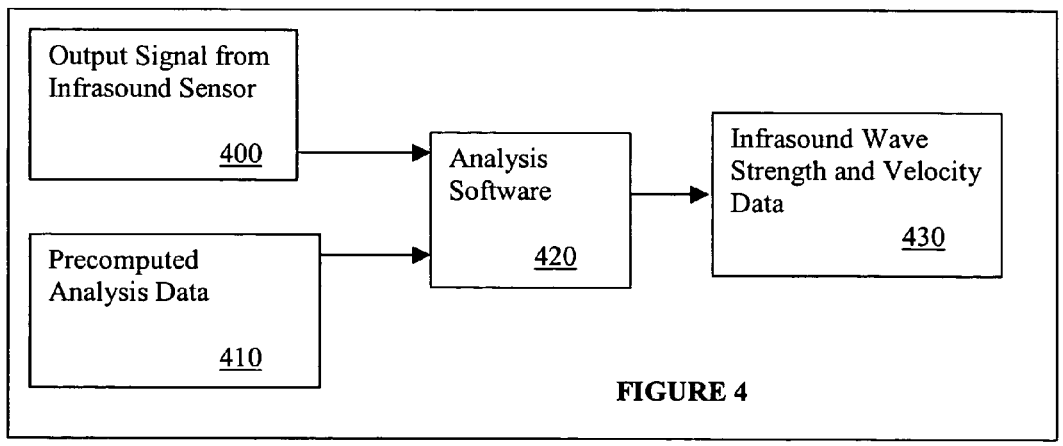
FIG. 4 depicts the analysis of an infrasound signal with the benefit of precomputed data.

When the raw data is complex and not amenable to the direct technique of FIG. 2, analysis can be split into precomputation and final analysis. Precomputation is presented in FIG. 3, which depicts computing a portion of the analyses ahead of time. The characteristics of the superconductor and the permanent magnet 300 are input into simulation or analysis software 330 to produce precomputed analysis data 340. Early computation is desirable because the characteristics of the potential well are well understood, but can be intense to compute. However, the potential well is constant for the life of the magnetic infrasound sensor, or at least between sensor calibrations. Other characteristics of the magnetic infrasound sensor will not change and can be computed ahead of time. The precomputed analysis data comprises the portions of the analysis that are treated as unchanging and can be thought of as a calibration step. The analysis of the time varying signal is simpler using precomputed analysis data, as is depicted in FIG. 4. In FIG. 4, the time varying signal from the infrasound sensor 400 is combined with the unchanging precomputed analysis data 410 during treatment by analysis software 420 to yield the characteristics of the infrasound wave 430.

Figure 5:
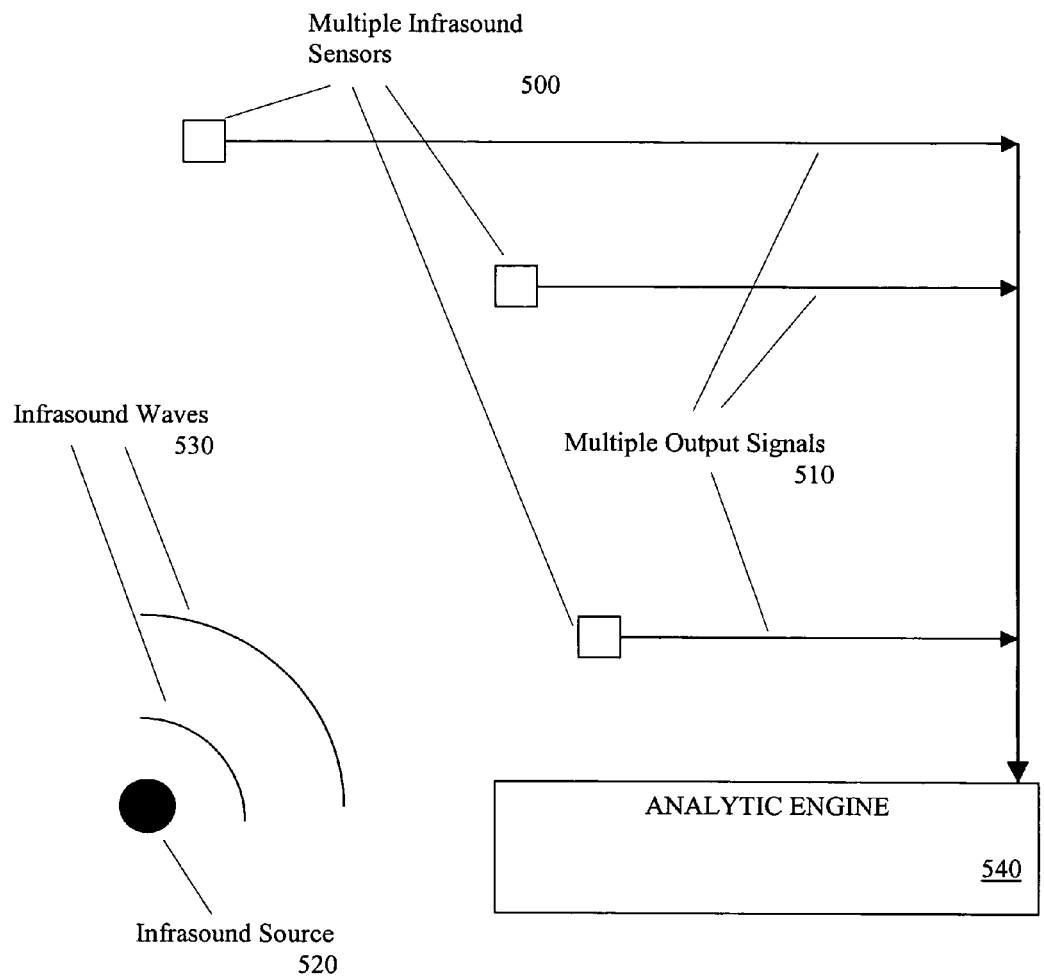
FIG. 5 depicts a multiplicity of infrasound sensors locating an infrasound signal source and characterizing the source strength and source type.

An infrasound wave is usually generated at a single spot, called the source location, such as an earthquake epicenter or the location of an explosion. FIG. 5 depicts a system for detecting the infrasound source location 520 by measuring the infrasound waves 530 using a multiplicity of sensors 500 at separate locations. A single infrasound sensor measures the strength, frequency, velocity, direction and polarization of an infrasound wave at the place the sensor is located. Combining and analyzing the signals 510 from multiple infrasound sensors in an analytic engine 540 will yield the location, strength and natural and manmade characteristics of the infrasound source. The use of infrasound sensor arrays for this purpose is well understood. However, current infrasound sensor arrays lack magnetic infrasound sensors, which provide strength, amplitude, frequency, velocity, direction and polarization of infrasound waves. In addition, magnetic infrasound sensors use narrow resonant frequencies to improve signal-to-noise ratios and sensitivities.

The combination of potential well and permanent magnet exhibits a frequency dependent response to an incoming infrasound wave. The reason is that the permanent magnet oscillates within the potential well and, as with any oscillator, the system has a set of characteristic frequencies. An infrasound wave matching a characteristic frequency of the system will cause constructive interference within the oscillator and therefore a strong signal. Other infrasound waves will cause destructive interference and therefore a damped signal. The characteristic frequencies of the system are determined by the shape and strength of the potential well and can be engineered into the magnetic infrasound sensor. Given a specific infrasound source, a magnetic infrasound sensor can be engineered to exhibit high sensitivity and a high signal-to-noise ratio.

Figure 1B:
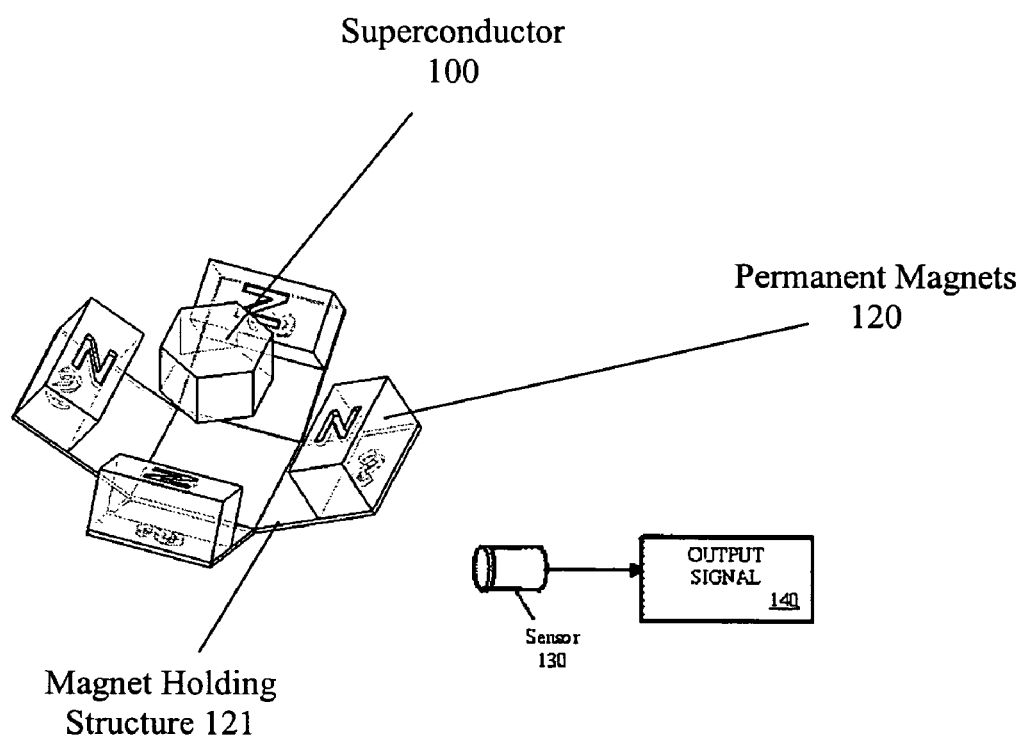
FIG. 1b is a diagram of an inverted magnetic infrasound sensor with the superconducting component in levitation over a plurality of magnets.

An inversion of all of the above arrangements is also possible. A superconductor can be levitated over at least one magnet, held in place by a holding structure 121, and the movement of the superconductor can be sensed in order to determine response to vibrational input. As shown in FIG. 1b, a plurality of magnets can be used to create a magnetic field of desired geometry in order to shape and control the magnetic well properties of the device.

Example of magnetic infrasound sensor deployment:

Magnetic infrasound sensors have been constructed and tested by the present inventors. The superconducting material used was a melt-textured 21 mm diameter puck of cooled high-temperature superconductor made from $YBa_2Cu_3O_7$, colloquially known as YBCO. The permanent magnet was a 4 mm diameter 1.6 mm thick disk of $Nd_2Fe_{14}B$. The sensing device consisted of 2 pairs of electromagnetic pick-up coils. Each pair of pickup coils operated in opposition to give a signal related to the permanent magnet's velocity. The signals from the sensing devices were analyzed using precomputed analysis data as depicted in FIGS. 3 and 4. Three infrasound sensors were used in an array as depicted in FIG. 5 to find the position, strength, frequency and polarization of an infrasound source. In this case, the source was a large explosion.

What is claimed is:

1. A magnetic infrasound sensor comprising:
   superconducting material;
   at least one permanent magnet placed in proximity to a superconducting material surface;
   a potential well arising from an act of placing the at least one permanent magnet; and
   at least one sensing device which generates a signals related to a position of the at least one permanent magnet.

2. The magnetic infrasound of claim 1 wherein the at least one sensing device generates a signals related to movements of the at least one permanent magnet.

3. The magnetic infrasound sensor of claim 1 wherein an analytical engine interprets the signals of the at least one sensing device to yield the strength, frequency, velocity, direction or polarization of infrasound waves.

4. The magnetic infrasound sensor of claim 2 wherein an analytical engine interprets the signals of the at least one sensing device to yield the strength, frequency, velocity, direction or polarization of infrasound waves.

5. A magnetic infrasound sensor system wherein data from one or more other infrasound sensors of claim 1 is used to measure the infrasound source location, source velocity, source direction, source strength, source frequency, source polarization or source type.

6. A magnetic infrasound sensor system wherein data from one or more other infrasound sensors of claim 2 is used to measure the infrasound source location, source velocity, source direction source strength, source frequency, source polarization or source type.

7. A magnetic infrasound sensor system wherein data from one or more other infrasound sensors of claim 3 is used to measure the infrasound source location, source velocity, source direction, source strength, source frequency, source polarization or source type.

8. A method of measuring infrasound waves comprising the steps of:
   obtaining superconducting material with a surface;
   placing one or more permanent magnets in proximity to the surface such that a potential well constraining a movement of the one or more permanent magnets is created; and
   generating one or more signals related to a position of the one or more permanent magnets.

9. The method of claim 8 wherein the one or more signals is related to the movement of the one or more permanent magnets.

10. The method of claim 8 comprising the additional step of:
    analyzing the one or more signals to measure the strength, frequency, velocity, direction or polarization of infrasound waves.

11. The method of claim 9 comprising the additional step of:
    analyzing the one or more signals to measure the strength, frequency, velocity, direction or polarization of infrasound waves.

12. The method of claim 8 comprising the additional steps of:
    obtaining signals or measurements from other infrasound sensors; and
    analyzing the signals or measurements to obtain a measurement of source location, source velocity, source direction, source strength, source frequency, source polarization or source type.

13. The method of claim 9 comprising the additional steps of:
    obtaining signals or measurements from other infrasound sensors, and analyzing the signals or measurements to obtain a measurement of source location, source velocity, source direction, source strength, source frequency, source polarization or source type.

14. The method of claim 10 comprising the additional steps of:
obtaining signals or measurements from one or more other infrasound sensors; and
analyzing the signals or measurements to obtain a measurement of source location, source velocity, source direction, source strength, source frequency, source polarization or source type.

15. A system for measuring infrasound wave strength, frequency, velocity, direction or polarization comprising more than one infrasound sensor wherein at least one of the more than one infrasound sensor is a magnetic infrasound sensor.

16. The system of claim 15 wherein the measurement is source location, source velocity, source direction, source strength, source frequency, source polarization or source type.

17. A magnetic infrasound sensor comprising:
superconductor material;
at least one permanent magnet placed in proximity to a superconducting material surface;
a potential well arising from an arrangement of said superconducting material and said at least one permanent magnet; and
at least one sensing device which generates signals related to a position of the superconductor material.

18. The magnetic infrasound sensor of claim 17 wherein the at least one sensing device generates a signals related to a movement of the at least one permanent magnet.

19. The magnetic infrasound sensor of claim 17 wherein an analytical engine interprets the signals of the at least one sensing device to yield the strength, frequency, velocity, direction or polarization of infrasound waves.

20. The magnetic infrasound sensor of claim 18 wherein an analytical engine interprets the signals of the at least one sensing device to yield the strength, frequency, velocity, direction or polarization of infrasound waves.

21. The magnetic infrasound sensor of claim 17 wherein data from one or more other infrasound sensors is used to measure the infrasound source location, source velocity, source direction, source strength, source frequency, source polarization or source type.

22. The magnetic infrasound sensor of claim 18 wherein data from one or more other infrasound sensors is used to measure the infrasound source location, source velocity, source direction, source strength, source frequency, source polarization or source type.

23. The magnetic infrasound sensor of claim 19 wherein data from one or more other infrasound sensors is used to measure the infrasound source location, source velocity, source direction, source strength, source frequency, source polarization or source type.

24. A magnetic infrasound sensor comprising:
superconducting material;
at least one permanent magnet placed in proximity to a superconducting material surface in order to levitate said superconducting material;
a potential well arising from the act of placing the superconducting material in proximity to the at least one permanent magnet; and
at least one sensing device which generates a signals related to a position of the levitated superconducting material.

25. The method of claim 24 wherein one or more of the signals of the at least one sensing device is related to a movement of the levitated superconducting material.

* * * * *